No. 623,731. Patented Apr. 25, 1899.
B. F. NICHOLAS.
CATCH BASIN OR INLET FOR SEWERS.
(Application filed Oct. 27, 1897.)
(No Model.) 2 Sheets—Sheet 1.
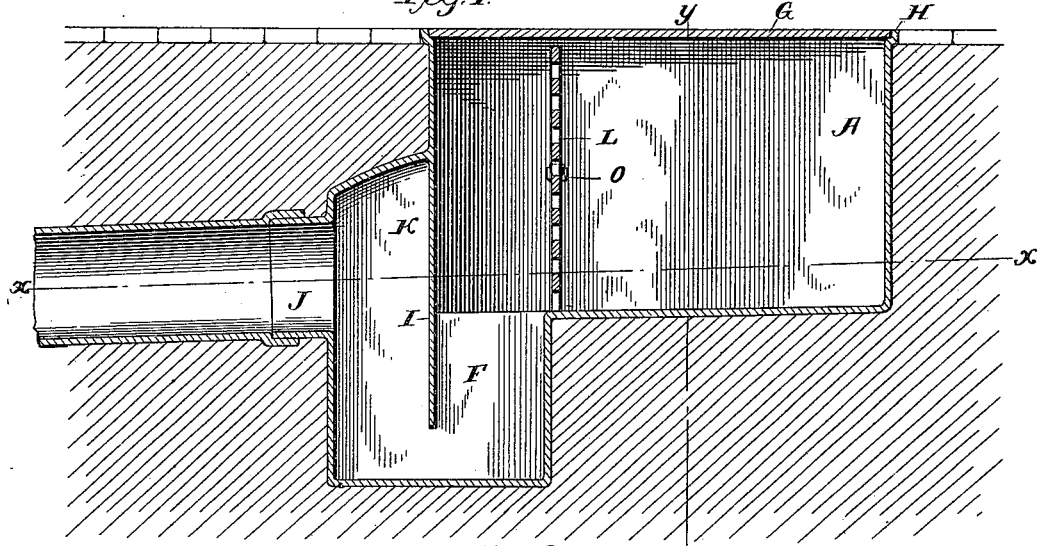
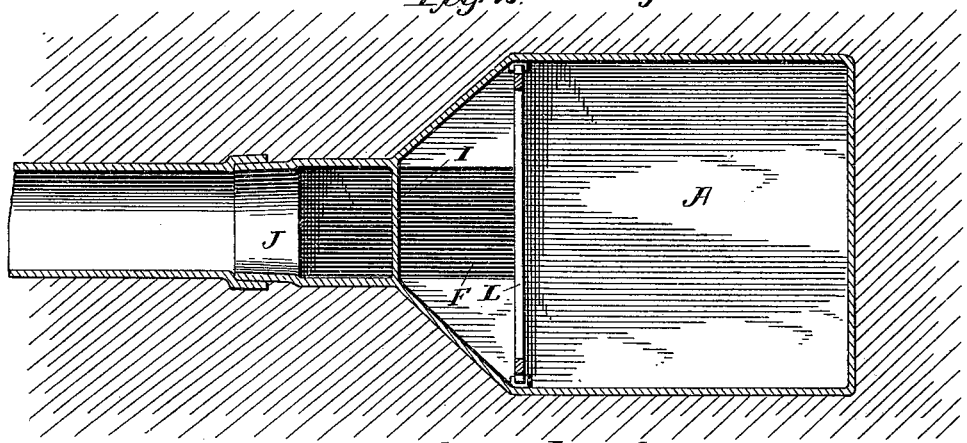
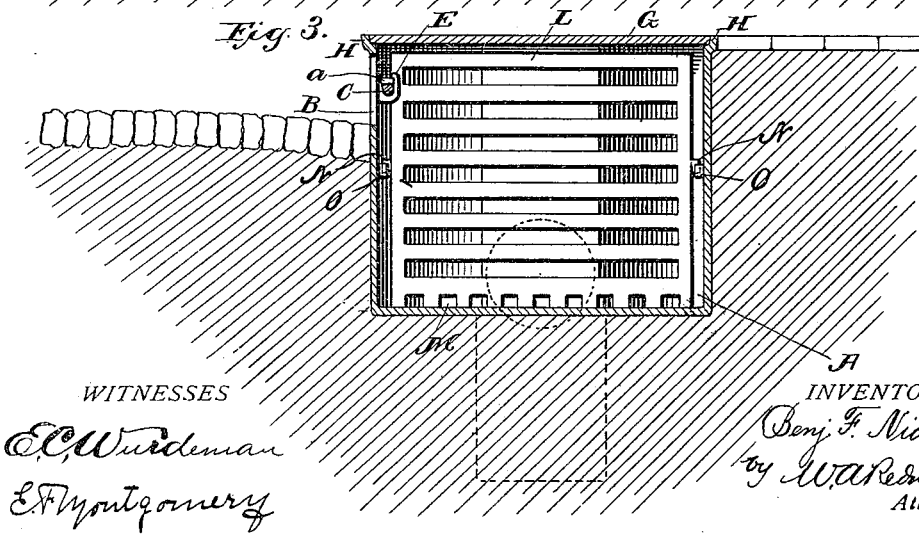
WITNESSES
INVENTOR
Benj. F. Nicholas
by W. A. Redmond
Attorney No. 623,731. Patented Apr. 25, 1899.
B. F. NICHOLAS.
CATCH BASIN OR INLET FOR SEWERS.
(Application filed Oct. 27, 1897.)
(No Model.) 2 Sheets—Sheet 2.

WITNESSES
E. C. Wurdeman
E. F. Montgomery

INVENTOR
Benj. F. Nicholas
by W. A. Redmond
Attorney

United States Patent Office.

BENJAMIN F. NICHOLAS, OF HARRISBURG, PENNSYLVANIA.

CATCH-BASIN OR INLET FOR SEWERS.

SPECIFICATION forming part of Letters Patent No. 623,731, dated April 25, 1899.

Application filed October 27, 1897. Serial No. 656,561. (No model.)

*To all whom it may concern:*

Be it known that I, BENJAMIN F. NICHOLAS, a citizen of the United States, residing at Harrisburg, in the county of Dauphin and State of Pennsylvania, have invented certain new and useful Improvements in Catch-Basins or Inlets for Sewers; and I do hereby declare the following to be a full, clear, and exact description of the invention, such as will enable others skilled in the art to which it appertains to make and use the same.

This invention relates generally to sewers, and particularly to catch-basins or inlets for street-sewers; and it has for its object to provide a durable and comparatively inexpensive catch-basin or inlet cast in one piece ready for installation and without the use of bricks or cement in setting or building the sewer-opening and which is adapted to entirely prevent the escape of foul air and gases through the opening; and it consists of the parts and combinations of parts hereinafter described and claimed.

Figure 4:
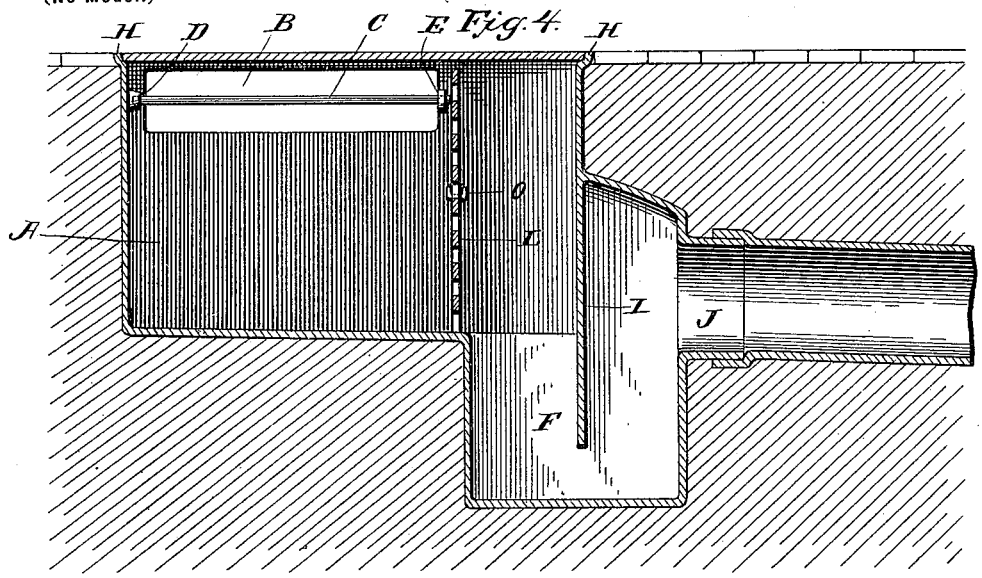

In the accompanying drawings, forming a part of this specification, Figure 1 is a longitudinal vertical section through my improved basin; Fig. 2, a horizontal section on the line $x\ x$, Fig. 1; Fig. 3, a vertical transverse section on the line $y\ y$, Fig. 1; Fig. 4, a longitudinal vertical section showing opposite side to that shown in the sectional view Fig. 1, and Fig. 5 a plan view of a modification.

Similar letters refer to similar parts throughout all the views.

Referring to the drawings, A represents the receiving-chamber of my improved catch-basin, having an inlet-opening B formed in one side thereof, which is provided with a bar C midway its depth to prevent the admission therethrough of large or bulky bodies, said bar being removably supported in place by a lug D, cast on the wall of the basin and having an eye or opening therein to receive one end of the bar and the other end of the bar being supported in a hook E, also cast with the wall of the basin. A block or wedge $a$ may be and is preferably driven between the end of the bar and the hook to secure the bar in place.

The basin is cast with a lower or drop chamber F, one end of which forms the trap proper, and the whole is covered by a single plate or cover G, fitting snugly in flanges H, cast or formed around the upper edge of the basin, so as to bring the same on a plane with the adjacent sidewalk, beneath which the catch-basin is arranged. The trap or chamber F is divided vertically by a downwardly-extending partition I, which is cast with the end wall of the basin and extends nearly to the bottom of the chamber or trap F, so as to form a water seal between the sewer and the receiving-chamber and to prevent siphoning of the water out of said trap or chamber. The outer half of the same extends above the tubular part or outlet J, to which the sewer-pipe connects, so as to form an air-chamber K.

The bottom of chamber A is inclined toward the trap or chamber F, and across the same is arranged a grate or grid frame L, having its bars extending transversely and its lower or bottom bar formed with the openings M, Fig. 3, so as not to catch any small sewage or debris that may enter the basin, but permit the same to escape through and into the trap and sewer, while all large and bulky matter will be caught, thereby preventing stoppage or choking of the sewer-pipe. It will be understood that I may arrange the bars of the grate or grid frame vertically, if I desire; but I regard their transverse arrangement as best for the purpose. The grate or grid frame is supported in position by a hanger or wedge-shaped lug N, cast at each side thereof, which fit down in V-shaped lugs O, cast on the walls of the basin, as best shown in Figs. 2, 3, and 4.

Figure 5:
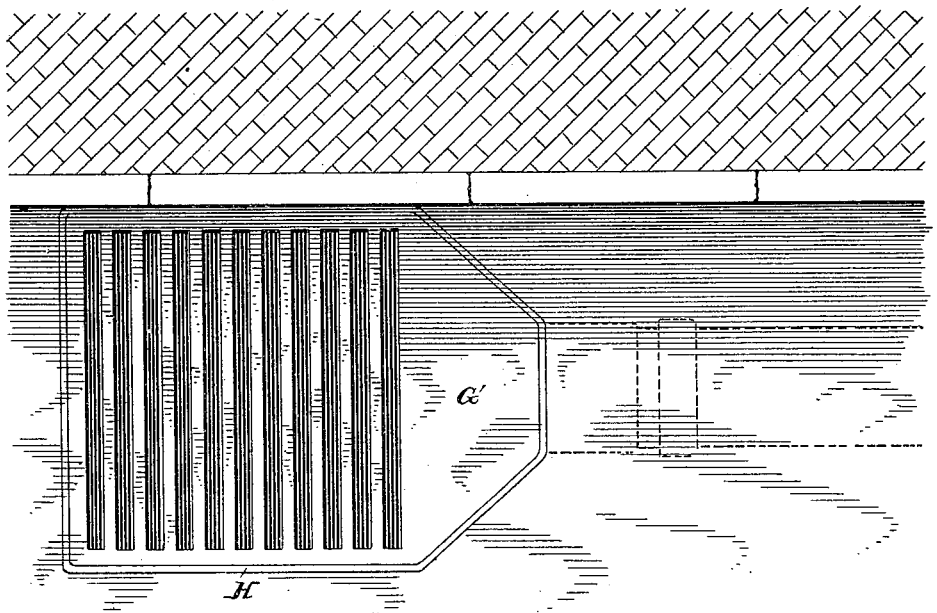

The basin above described is designed for use under a sidewalk, with its opening B on a level with the gutter; but it may be formed without the side opening B and set flush with the street or gutter, and in which case, as in Fig. 5, the cover is either perforated or slotted openings formed therein, so that the sewage may flow directly through the same and into the basin. In Fig. 5 the cover G' is shown slotted and fitting down in the flanges H.

It will be observed that the dropping of the trap or chamber F permits of placing the same below the frost-line, thereby preventing the freezing of the water forming the water seal therein and consequent clogging or choking of the basin. It will be also observed that there cannot be any escape of foul air or gases from the sewer owing to the arrangement of the trap and that the siphoning of the water therefrom is effectually prevented by the air-chamber K above, thereby insuring the maintenance of the water seal at all times. In cleaning out the basin the cover is to be lifted off, so as to give ready access to both the receiving-chamber and the trap, and in the former, owing to its inclined floor or bottom, the refuse will be found to be dry, or practically so, thereby rendering it much easier to clean the basin thoroughly.

Sewer inlets or catch-basins are generally made or built from brick laid in cement-mortar, and owing to the porous character of the brick they absorb the moisture from the sewage, and it is found almost impossible to keep them clean and sweet; but with a smooth iron basin, such as above described, it requires but a comparatively small quantity of fresh water to thoroughly clean and flush the chambers or traps.

Having thus described my invention, what I claim as new, and desire to secure by Letters Patent, is—

A catch-basin or inlet for sewers, consisting of a receiving-chamber having a side inlet-opening, and an inclined bottom, a trap on a lower level communicating with said receiving-chamber, a partition dividing the upper part of said trap, an air-chamber above said trap, an outlet-pipe connected with said trap, a vertical grid or grate frame separating the trap and receiving-chamber, and a cover for said trap and receiving-chamber.

In testimony whereof I affix my signature in presence of two witnesses.

B. F. NICHOLAS.

Witnesses:
H. M. STERLING,
D. G. MENCHINE.